United States Patent
Shah et al.

(10) Patent No.: US 11,718,127 B2
(45) Date of Patent: Aug. 8, 2023

(54) AXLE ASSEMBLY WITH INTERNAL LUBRICATION SYSTEM

(71) Applicant: ArvinMeritor Technology, LLC, Troy, MI (US)

(72) Inventors: Deval H. Shah, Novi, MI (US); Stephen A. Federighe, Washington, MI (US); Jeffrey C. Audet, Chesterfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 562 days.

(21) Appl. No.: 16/878,702

(22) Filed: May 20, 2020

(65) Prior Publication Data

US 2021/0364039 A1 Nov. 25, 2021

(51) Int. Cl.
*B60B 19/08* (2006.01)
*B60B 35/12* (2006.01)
*B60B 27/00* (2006.01)
*B60C 23/00* (2006.01)
*F16N 9/02* (2006.01)

(52) U.S. Cl.
CPC .......... *B60B 19/08* (2013.01); *B60B 27/0047* (2013.01); *B60B 35/122* (2013.01); *B60C 23/00327* (2020.05); *B60C 23/00363* (2020.05); *F16N 9/02* (2013.01); *B60B 2900/561* (2013.01); *B60B 2900/731* (2013.01)

(58) Field of Classification Search
CPC .......... B60B 27/0047; B60B 2900/561; B60C 23/00327; B60C 23/00363; F16N 9/02
See application file for complete search history.

(56) References Cited

U.S. PATENT DOCUMENTS

| | | | | |
|---|---|---|---|---|
| 419,494 A * | 1/1890 | Bowden | ..... | F16N 7/12 384/380 |
| 4,142,615 A * | 3/1979 | Sidles, Jr. | ..... | F16D 55/40 180/370 |
| 4,461,373 A * | 7/1984 | Pratt | ..... | F16D 55/40 74/391 |
| 4,465,169 A * | 8/1984 | Houtz | ..... | F16H 57/0434 192/113.36 |
| 4,496,017 A * | 1/1985 | Rogier | ..... | F16H 57/04 180/370 |
| 5,174,839 A * | 12/1992 | Schultz | ..... | B60C 23/00318 384/489 |

(Continued)

*Primary Examiner* — Scott A Browne
(74) *Attorney, Agent, or Firm* — Brooks Kushman PC (57) ABSTRACT

An axle assembly includes a spindle to receive a drive shaft having a rotational input about an axis and a wheel hub rotatably supported by at least one roller bearing disposed on the spindle. A tire inflation system defines a spindle gas passage to route pressurized gas from an onboard source through the spindle. The tire inflation system includes a seal chamber between the spindle and wheel hub to transfer gas from the spindle to the wheel hub, and a hub gas passage in fluid communication with the seal chamber is arranged to route the pressurized gas to a tire. A lubrication system having a reservoir is located axially outboard of the seal chamber and at least one hub lubricant passage routes lubricant between the reservoir to a roller bearing located axially inboard of the seal chamber. The hub lubricant passage routes lubricant radially outward of the seal chamber.

20 Claims, 5 Drawing Sheets

(56) References Cited

U.S. PATENT DOCUMENTS

| | | | | |
|---|---|---|---|---|
| 5,658,053 | A | * | 8/1997 | Vencill .................... B60B 27/02 |
| | | | | 301/105.1 |
| 9,539,865 | B2 | * | 1/2017 | Lakin ................ B60C 23/00345 |
| 2015/0352911 | A1 | * | 12/2015 | Bittlingmaier ........ F16L 27/087 |
| | | | | 152/417 |
| 2019/0039409 | A1 | | 2/2019 | Eschenburg et al. |

* cited by examiner

AXLE ASSEMBLY WITH INTERNAL LUBRICATION SYSTEM

TECHNICAL FIELD

This disclosure relates to an axle lubrication system to route lubricant to internal hub mechanisms.

BACKGROUND

An axle assembly having a lubrication features and a tire inflation system is disclosed in U.S. Patent Application Publication No. 2019/0039409.

SUMMARY

An axle assembly includes a spindle configured to receive a drive shaft having a rotational input about an axis and a wheel hub rotatably supported by at least one roller bearing disposed on the spindle. The axle assembly also includes a tire inflation system defining a spindle gas passage arranged to route a pressurized gas from an onboard source through the spindle. The tire inflation system also includes a seal chamber between the spindle and wheel hub arranged to transfer gas from the spindle to the wheel hub, and a hub gas passage in fluid communication with the seal chamber and arranged to route the pressurized gas to a tire. The axle assembly further includes a lubrication system having a reservoir located axially outboard of the seal chamber and at least one hub lubricant passage arranged to route lubricant between the reservoir and a roller bearing located axially inboard of the seal chamber. The hub lubricant passage is radially outward of the seal chamber and in fluid isolation from the seal chamber.

An axle assembly includes a spindle configured to receive a drive shaft having a rotational input about an axis and a wheel hub rotatably supported by a roller bearing disposed on the spindle. The axle assembly also includes a hub gear reduction mechanism to adjust a rotational speed input from the drive shaft. The hub gear reduction mechanism is disposed within a lubricant reservoir at least partially formed by the wheel hub. The axle assembly also includes a tire inflation system to supply pressurized gas to a tire. The tire inflation system includes a first gas passage to route gas through the spindle, a second gas passage in fluid communication with the tire to route gas through the wheel hub, and an annular seal chamber disposed radially between the spindle and the wheel hub. The seal chamber is disposed axially between the lubrication reservoir and the roller bearing, and the seal chamber fluidly connects the first gas passage to the second gas passage. The wheel hub defines at least one internal lubricant passage arranged to route lubricant from the reservoir to axially bypass the seal chamber to lubricate the roller bearing.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring collectively to FIG. 1 through FIG. 5, a portion of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may also include a trailer for transporting cargo in one or more embodiments.

One or more axle assemblies may be provided with the vehicle. For example, the axle assembly 10 may be a single drive axle assembly or may be configured as part of a tandem axle configuration or multi-axle configuration that may include a plurality of axle assemblies that may be connected in series.

Figure 1:
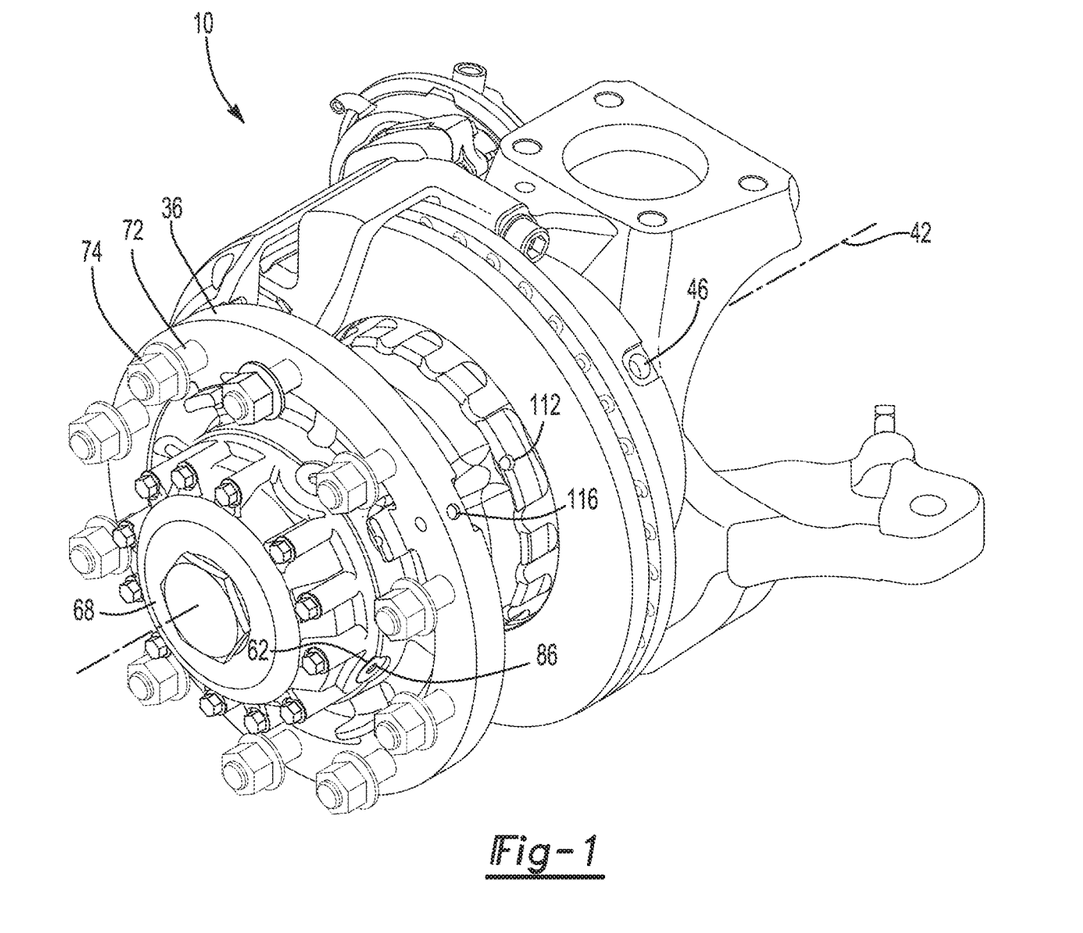
FIG. 1 is a perspective view of a portion of an axle assembly.
Figure 2:
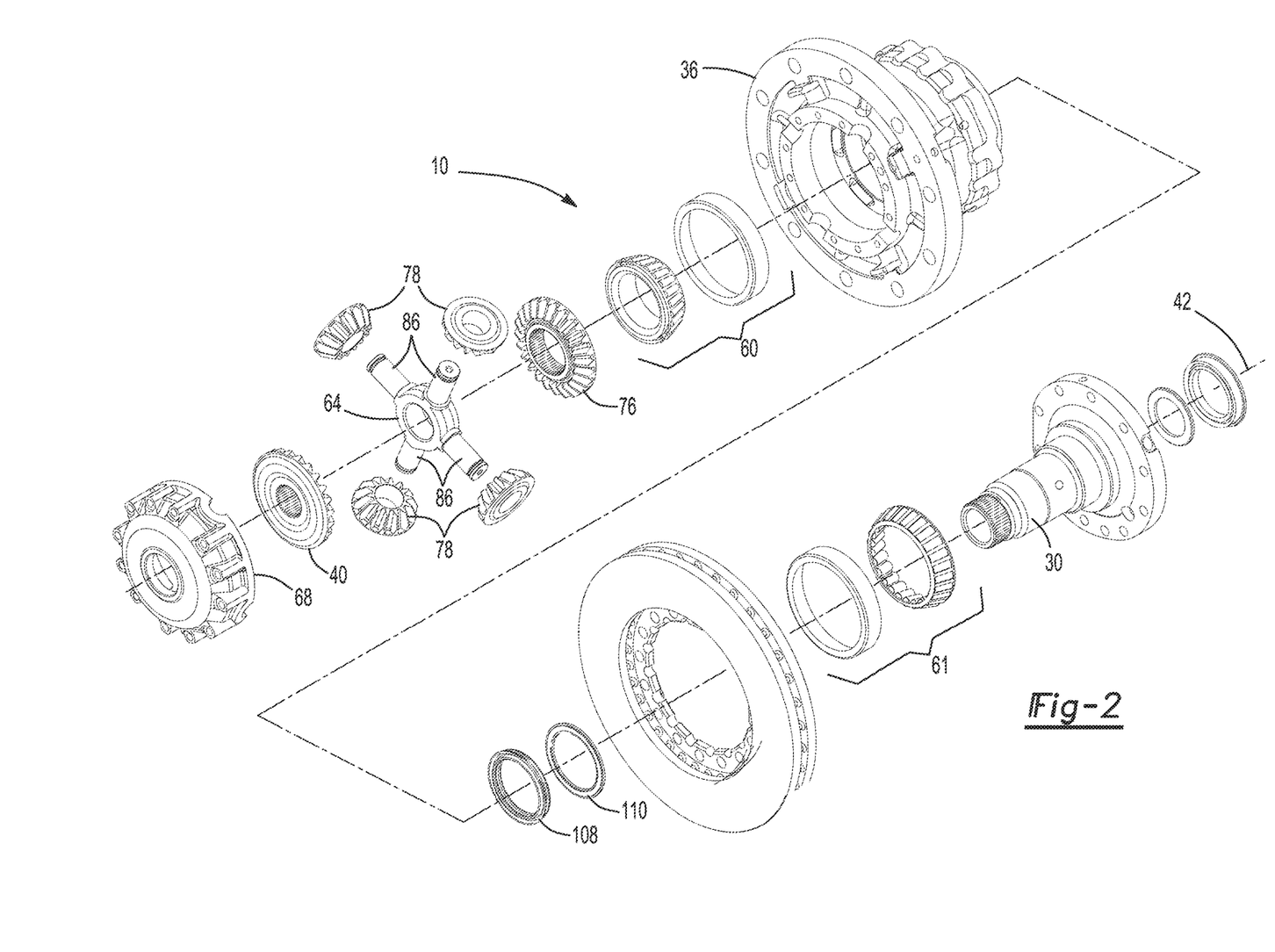
FIG. 2 is an exploded view of components of the axle assembly of FIG. 1.

The axle assembly 10 may be a drive axle that may receive torque from a power source, such as an internal combustion engine or electric motor, and may provide torque to one or more traction wheel assemblies having a tire mounted on a wheel (not shown). Only a portion of the axle assembly 10 is shown in FIG. 1. As such, it is to be understood that the portion of the axle assembly 10 that is shown may also be provided at an opposing end of the axle assembly 10 to support at least one other traction wheel assembly.

The axle assembly 10 may include a fixed spindle 30. In at least one configuration, the spindle 30 includes a spindle hole 32 to through which a rotating axle shaft 34 extends. The axle assembly 10 also includes a hub 36 and a hub gear reduction mechanism 38. The axle shaft 34 may receive input torque from a drive unit and transfer the torque to a first side gear 40 that rotates with the axle shaft 34 about axis 42. A first end of the axle shaft 34 passes through the fixed spindle 30 and may be operatively connected to the hub gear reduction mechanism 38 via the first side gear 40. For example, a first side gear hole 44 may have a spline that mates with a corresponding spline on the axle shaft 34 such that the first side gear 40 may not rotate with respect to the axle shaft 34.

While gear reduction mechanism 38 is provided by way of example, the lubrication solutions provided by the present disclosure may similarly apply to other types of central tire inflation systems that require lubrication outboard of the routing of pressurized gas to the tire. That is, the solutions may apply to other types of planetary hubs, or other wheel hubs without gear reduction.

The spindle 30 interfaces with various components of the axle assembly 10. In addition, the spindle 30 may facilitate mounting of the axle assembly 10 to the vehicle via bolting to other fixed portions of the wheel-end. The spindle 30 may be mounted to at least a portion of a differential that transmits torque to the vehicle traction wheel assemblies and permits opposing traction wheel assemblies to rotate at different velocities in a manner known by those skilled in the art. The spindle may also support one or more roller bearings as will be discussed in more detail below. Also discussed in more detail below, the spindle 30 may include one or more passages 46 that are part of a tire inflation system to supply pressurized gas to control the inflation pressure of the tire.

The spindle 30 may define a first spindle end 50 toward an outboard side, a second spindle end 52 toward an inboard side. The spindle hole 32 may extend from the first spindle end 50 to the second spindle end 52. Moreover, the spindle hole 32 may receive the axle shaft 34 such that the spindle 30 is spaced apart from and may not directly engage the axle shaft 34. The axle shaft 34 may also extend beyond the spindle 30 to engage and help support the hub gear reduction mechanism 38. Discussed in more detail below, the fixed spindle 30 may be further arranged to support the rotatable hub 36 via a plurality of roller bearings that allow rotation of the hub 36 about the spindle 30.

The hub 36 may receive a portion of one or more components of the axle assembly 10, such as the axle shaft 34, spindle 30, and/or the hub gear reduction mechanism 38. The hub 36 may be spaced apart from and may not directly engage the spindle 30 or the axle shaft 34. In at least one configuration, the hub 36 may include a first hub portion 54, a second hub portion 56, and a hub mounting flange 58 to support a vehicle wheel (not shown). In addition, the hub 36 may be rotatably supported by one or more wheel bearings.

The first hub portion 54 may extend outwardly along the direction of axis 42 and define a cavity to at least partially receive the hub gear reduction mechanism 38. The first hub portion 54 may have a single piece or a multi-piece configuration and may define one or more spider shaft holes 62 that may receive a shaft of a spider 64 of the hub gear reduction mechanism 38 as will be discussed in more detail below. The first hub portion 54 may also have an end surface 66 that may face outward. A hub cap 68 may be disposed on the end surface 66 of the first hub portion 54. For example, the hub cap 68 may be secured to the end surface 66 with a plurality of fasteners, such as bolts extending through the hub cap 68 into the hub 36. According to some examples, the hub 36 includes a first portion of the spider shaft holes 62 and the hub cap 68 includes a second mating portion of the spider shaft holes 62 to retain the spider 64.

The second hub portion 56 may extend inwardly along the direction of axis 42 and mate to other components of the axle assembly 10. The second hub portion 56 may also receive one or more wheel bearings and a hub seal 70. In the examples of the present disclosure a first wheel bearing 60 is disposed near the first spindle end 50 and a second wheel bearing 61 is disposed near the second spindle end 52. The hub seal 70 may be annular and extend continuously around the axis 42. The hub seal 70 may engage the spindle 30 and the hub 36 to help retain lubricant inside the second hub portion 56 as well as inhibit contaminants from entering the hub 36.

The hub mounting flange 58 may radially extend from the axis 42. For instance, the hub mounting flange 58 may extend substantially perpendicular to the axis 42 in one or more configurations. The hub mounting flange 58 may facilitate mounting of the wheel (not shown). In some examples, the hub mounting flange 58 may include a set of mounting lug holes that may each receive a wheel mounting lug 100. Each wheel mounting lug 72 may extend through a corresponding hole in the wheel. A lug nut 74 may be threaded onto each wheel mounting lug 72 to secure the wheel to the hub 36.

As mentioned above, one or more wheel bearings may rotatably support the hub 36. Each of the first wheel bearing 60 and the second wheel bearing 61 may be disposed inside the second hub portion 56 of the hub 36 and may extend continuously around an exterior surface of the spindle 30. As such, the hub 36 may be rotatably disposed on the spindle 30 and may be rotatable about the axis 42 with respect to the spindle 30. In at least one configuration, the first wheel bearing 60 and the second wheel bearing 61 may be axially positioned along the axis 42 between the hub gear reduction mechanism 38 and the hub seal 70. The first wheel bearing 60 and a second wheel bearing 61 may have any suitable configuration. In some examples, the wheel bearings may be roller bearing assemblies that may include a plurality of roller bearing elements that may be disposed between an inner race and an outer race. As such, the inner race may be disposed on the spindle 30 and the outer race may be disposed on the hub 36.

The hub gear reduction mechanism 38 may operatively connect the axle shaft 34 to the hub 36. The hub gear reduction mechanism 38 may be at least partially disposed in the hub 36 and may transmit torque between the axle shaft 34 and the hub 36. In at least one configuration, the hub gear reduction mechanism 38 may include a first side gear 40, a second side gear 76, a spider 64, and one or more pinion gears 78. According to some examples, four pinion gears 78 are provided as part of the hub gear reduction mechanism 38.

The first side gear 40 may be disposed inside the hub 36 and may be mounted to the axle shaft 34. For instance, the first side gear 40 may be disposed in a cavity formed by the first hub portion 54 and the hub cap 68. As described above, the first side gear hole 44 may have a spline that mates with a corresponding spline on the axle shaft 34 such that the first side gear 40 may not rotate with respect to the axle shaft 34. The first side gear hole 44 may be disposed along the axis 42 and may receive the axle shaft 34 such that the first side gear 40 rotates with the axle shaft 34.

The first side gear 40 may include and inward facing portion that is spaced from the spider 64. The first side gear 40 may also have a set of teeth arranged around the axis 42 that mates with teeth on one or more pinion gears 78. A thrust washer or bearing 80 may be disposed between the first side gear 40 and the hub cap 68 to inhibit axial movement of the first side gear 40 toward the hub cap 68.

The second side gear 76 may be partially or completely disposed inside the hub 36. For instance, the second side gear 76 may be disposed in the first hub portion 54 and may be disposed on the spindle 30 at the first spindle end 50. The second side gear 76 may include a second side gear hole 82 and a set of outwardly-facing gear teeth.

The second side gear hole 82 may be disposed along the axis 42 and may receive the spindle 30 such that the second side gear 76 may rotate with the spindle 30. In some examples, the second side gear hole 82 may have a spline that mates with a corresponding spline on the spindle 30 such that the second side gear 76 may not rotate with respect to the spindle 30.

The second side gear 76 may be spaced apart from the spider 64. The second side gear 76 may include a set of outwardly-facing teeth arranged around the axis 42 configured to mate with teeth on one or more pinion gears 78. A spacer 84 or bearing may be disposed between the second side gear 76 and the first wheel bearing 60 to inhibit axial movement of the second side gear 76 toward the second hub portion 56.

The spider 64 may be partially or completely disposed inside the hub 36 and may be axially positioned between the first side gear 40 and the second side gear 76. The spider 64 may include a central hole to allow for pass through of the axle shaft 34 and one or more spider shafts 86 each interfacing with the one or more pinion gears 78. The central hole may be disposed along the axis 42. The axle shaft 34 is configured to extend through the central hole of the spider 64.

Each of the spider shafts 86 may extend away from the axis 42. For example, the spider shafts 142 may extend along a spider shaft axis 150. For example, the spider shafts 142 may be substantially cylindrical in one or more embodiments. In the examples of the present disclosure, the spider shafts 86 each extend generally perpendicularly with respect to axis 42. In other alternate examples the spider shafts may be disposed at a non-perpendicular angles with respect to the axis 42 to help provide a desired gear reduction ratio. More specifically, the spider shafts may be inclined either outwardly toward the hub cap 68 or alternatively inclined inwardly toward the second hub portion 56. Each spider shaft 86 may be received in a spider shaft hole 62. As best seen in the perspective of FIG. 1, the spider shaft holes 62 may be formed by the joining of the of the hub 36 and the hub cap 68. Said another way, the hub 36 may form a first inboard portion of each spider shaft hole 62, and the hub cap 68 may form an opposing second outboard portion of each spider shaft hole.

A pinion gear 78 may be rotatably disposed on a corresponding spider shaft 86. The pinion gears 78 may be disposed in the first hub portion 54. For example, each pinion gear 78 may have a pinion gear hole that may receive a corresponding spider shaft 86. Optionally, a bearing (not shown) may be disposed in the pinion gear hole between the spider shaft 86 and the pinion gear 78 to facilitate rotation of each pinion gear 78 with respect to a corresponding spider shaft 86. Each pinion gear 78 includes a set of teeth that mates with the teeth on the first side gear 40 and teeth on the second side gear 76. As such, the pinion gears 78 may be in meshing engagement with the first side gear 40 and the second side gear 76.

Figure 4:
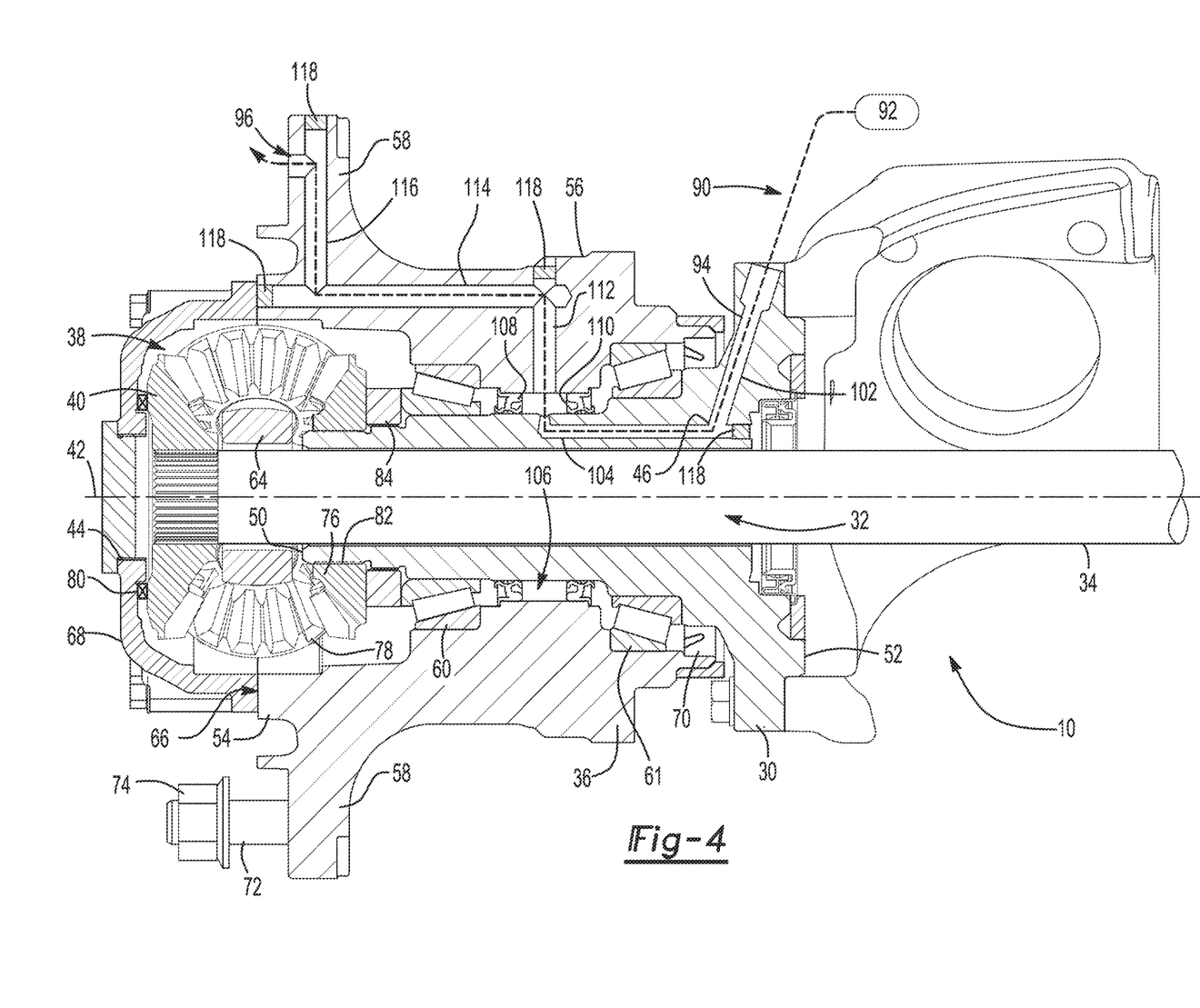
FIG. 4 is a partial cutaway view along line 4-4 of the axle assembly of FIG. 1.

With specific reference to FIG. 4, the axle assembly 10 also includes a tire inflation system 90 to maintain a desired air pressure within each tire. The tire inflation system 90 may be disposed on the vehicle and may be configured to provide a pressurized gas or pressurized gas mixture to one or more tires mounted to an axle assembly 10. For clarity, the term "pressurized gas" may refer to either a pressurized gas or a pressurized gas mixture in this application. The tire inflation system 90 may include a control system that may monitor and control the inflation of one or more tires, a pressurized gas source 92, as well as pressure along any of a number of locations of the tire inflation system 90.

The pressurized gas source 92 may be configured to supply or store a volume of a pressurized gas or pressurized gas mixture, like air or nitrogen. For example, the pressurized gas source 92 may be a tank and/or a pump like a compressor. The pressurized gas source 92 may be disposed on the vehicle and may provide a pressurized gas or pressurized gas mixture at a pressure that is greater than or equal to a desired inflation pressure of a tire. As such, the pressurized gas source 92 may inflate a tire or maintain a desired tire pressure.

The tire inflation system 90 may fluidly connect the pressurized gas source 92 to the tire. The tire inflation system 90 may include one or more passages 46 to deliver pressurized gas to each tire. The spindle 30 includes an inlet port portion 94 to route gas through the spindle 30. The hub mounting flange 58 includes a tire inflation outlet port 96 in fluid communication with the tire to route gas through the wheel hub. In addition, one or more valves (not shown) may be associated with or provided in fluid communication with the passages 46 to enable or disable the flow of the pressurized gas from the pressurized gas source 92 to one or more tires. An example flow path of pressurized gas is represented by the dashed arrow along the passages 46 in FIG. 4. The routing shapes of the passages 46 between the pressurized gas source 92 and the tire inflation outlet port 96 is exemplary and is not meant to be limiting as other routing types and paths may be suitable. In alternate examples, conduits, such as a hose, tubing, pipe, or combinations thereof are provided in lieu of the passages 46.

At least a portion of the passage 46 may extend through the spindle 30. The passage 46 may include a first portion 102 in fluid communication with a second portion 104. The first portion 102 may operate as an inlet that receives pressurized gas from the pressurized gas source 92. The first portion 102 may be disposed between the first spindle end 50 and the second spindle end 52. According to at least one example, the first portion 102 may extend toward the axis 42 and may be linear. The second portion may extend axially within the spindle 30. The first portion 102 and the second portion 104 of the passage 46 may collectively extend through the spindle 30 to bypass the second wheel bearing 61. While an example routing of the passage 46 is depicted in FIG. 4, different arrangements may be suitable to direct pressurized gas within the spindle to bypass the second wheel bearing 61.

The second portion 104 may include an outlet that delivers pressurized gas to another component, such as the hub 36. Since the spindle 30 and hub 36 may rotate with different speeds with respect to each other, a seal chamber 106 operates as a sealed transfer to pass the pressurized gas from the second portion 104 to the hub 36.

The seal chamber 106 includes a first sealing element 108 and a second sealing element 110. The first sealing element 108 may be an annular shape and extend circumferentially about the axis 42 to create a high-pressure seal between an outer diametrical surface of the spindle 30 and an inner diametrical surface of the hub 36. The first sealing element 108 maintains the high-pressure seal while allowing relative rotation between the spindle 30 and the hub 36. Moreover, the first sealing element 108 is located axially outboard of the seal chamber 106 to prevent lubricating fluid circulating about the hub gear reduction mechanism 38 and first wheel bearing 60 from entering the seal chamber 106.

The second sealing element 110 may also define an annular shape and extend circumferentially about the axis 42 to create a high-pressure seal between an outer diametrical surface of the spindle 30 and an inner diametrical surface of the hub 36. The second sealing element 110 additionally maintains a high-pressure seal while allowing relative rotation between the spindle 30 and the hub 36. However, the second sealing element 110 is located axially inboard of the seal chamber 106 to prevent lubricating fluid circulating about the second wheel bearing 61 from entering the seal chamber 106.

As discussed in more detail below, the fluid isolation of the seal chamber 106 to allow for routing of pressurized gas from the spindle 30 to the hub 36 (and subsequently the tire) creates a unique challenge in ensuring lubricant is circulated on either side of the seal chamber 106.

Once the pressurized gas is routed to the hub 36, at least a portion of the passage 46 may also extend through the hub 36 to provide air to the tire. The passage 46 may include a third portion 112, a fourth portion 114, and a fifth portion 116 that is in fluid communication with the tire inflation outlet port 96 disposed at the hub mounting flange 58. As described above, the tire inflation outlet port 96 provides pressurized gas to the tire once a wheel is mounted to the hub 36. While an example routing depicting five portions is provided for visualization, any number and/or arrangement of the various portions of the passages may be suitable to pass pressurized air through each of the spindle 30 and the hub 36.

Related to manufacturability and/or tooling considerations, certain portions of the passages may extend through an outer surface of the component through which the portion is routed. Any number of plugs may be provided to maintain the high-pressure fluid seal within the passages 46. For example, the second portion 104 may extend axially inward and through the second spindle end 52. A plug 118 may be disposed in a distal end of the second portion 104 near the second spindle end 52 and maintain a high-pressure fluid seal. According to some examples, the plug 118 may be configured as a ball that may be press fit into a distal end of any of the portions of the passages 46. In other examples, the plug 118 may be configured as a sealed disk or other type of expandable element disposed within passage 46 to maintain a high-pressure fluid seal.

The third portion 112 may similarly extend through an outer diametrical surface of the hub 36. A plug 118 may be disposed in a distal end of the third portion 112 near the outer diametrical surface of the hub 36 to maintain a high-pressure fluid seal.

Similarly, the fourth portion 114 may extend through the end surface 66 of the hub 36. A plug 118 may be disposed in a distal end of the fourth portion 114 near the end surface 66 of the hub 36 to maintain the high-pressure fluid seal of the passages 46.

The fifth portion 116 may extend radially through an outer diametrical surface of the hub mounting flange 58. Thus, like previous examples, a plug 118 may be disposed in a distal end of the fifth portion 116 near the outer diametrical surface of the hub mounting flange 58 to maintain the high-pressure fluid seal of the passages 46.

Figure 5:
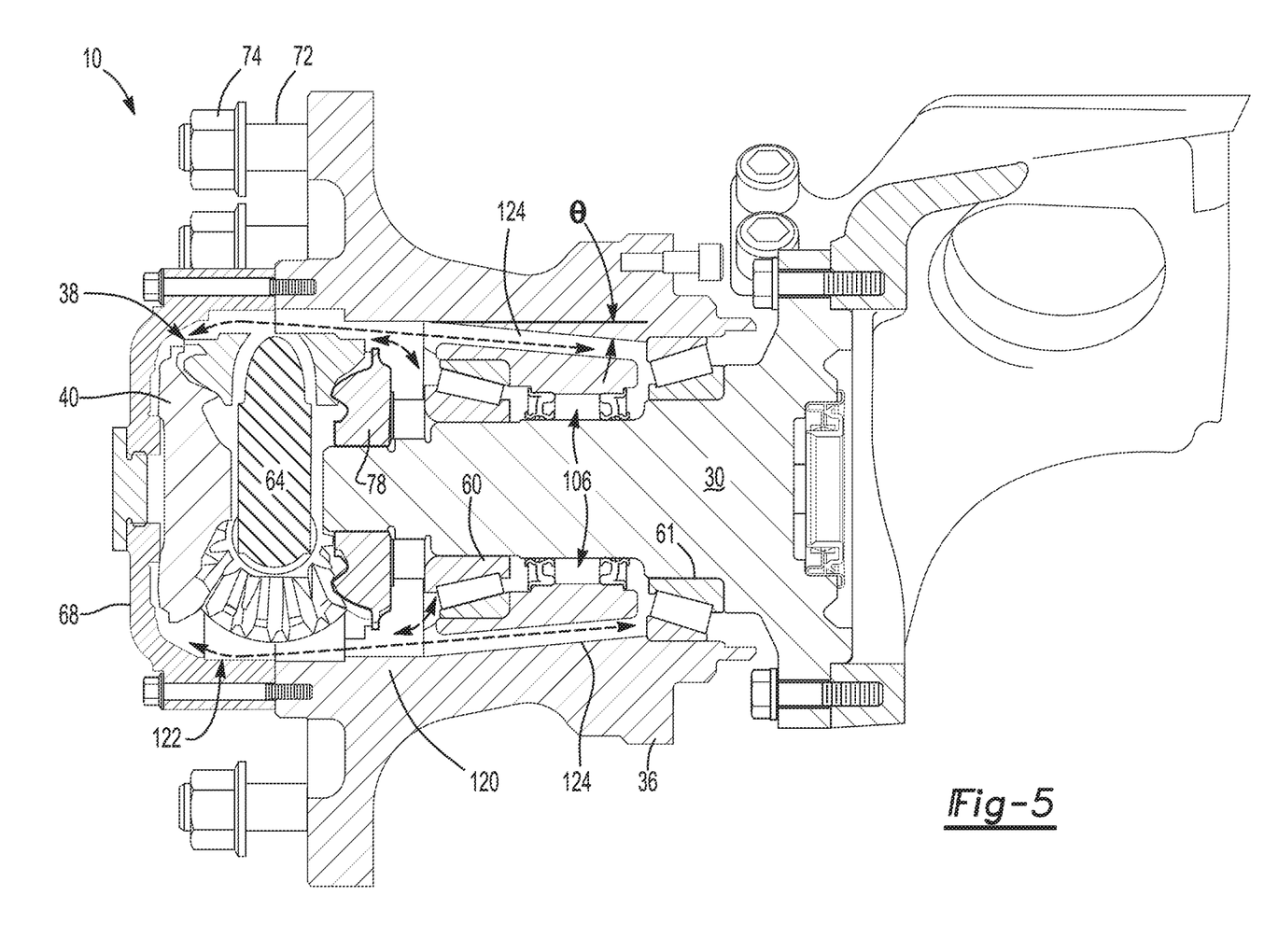
FIG. 5 is a partial cutaway view along line 5-5 of the axle assembly of FIG. 1.

With specific reference to FIG. 5, a lubrication system 120 is provided to circulate fluid lubrication across the hub gear reduction mechanism 38 and each of the first wheel bearing 60 and a second wheel bearing 61. The hub gear reduction mechanism 38 and the first wheel bearing 60 are each positioned axially outboard of the seal chamber 106. Conversely, the second wheel bearing 61 is positioned axially inboard of the seal chamber 106. The hub gear reduction mechanism 38 is disposed a lubricant reservoir 122. Lubricant may be at least partially cycled by a churning effect provided by the movement of the components of the hub gear reduction mechanism 38. Thus, the hub gear reduction mechanism is arranged to circulate lubricant during wheel hub rotation. As noted above, while gear reduction mechanism 38 is provided by way of example, the lubrication solutions provided by the present disclosure may similarly apply to other types of central tire inflation systems that require lubrication outboard of the routing of pressurized gas to the tire. That is, the solutions may apply to other types of planetary hubs, or other wheel hubs without gear reduction. More specifically, any mechanical element requiring lubrication outboard of an air passage may benefit from the solutions of the present disclosure.

According to aspects of the present disclosure, the lubrication system 120 provides a means for lubrication to axially bypass the seal chamber 106 without compromising the high-pressure seal of the tire inflation system 90. The lubrication system 120 allows for an exchange of lubricant between the lubricant reservoir 122 and the second wheel bearing 61. In the absence of such a lubrication system, a separate dedicated lubrication reservoir may be required for the second wheel bearing 61 which would be fluidly isolated from the lubricant reservoir 122 by the intervening seal chamber 106.

The lubrication system 120 includes a plurality of internal passages 124 arranged to provide an axial bypass of the seal chamber 106 to allow lubricant to circulate between the lubricant reservoir 122 and the second wheel bearing 61. The lubricant reservoir 122 is defined by an internal cavity formed by the joining of the hub cap 68 to the hub 36. Since the hub 36 encloses the first sealing element 108 and a second sealing element 110 of the tire inflation system 90, the internal passages are arranged to allow for an axial bypass of the seal chamber while maintaining fluid isolation between the tire inflation system 90 and the lubrication system 120. According to some examples, the internal passages 124 pass lubricant at a location that is radially outward of the seal chamber 106. The internal passages 124 also maintain fluid isolation from the seal chamber 106. An example flow path of lubricant within the internal passages 124 is represented by the dashed arrows of FIG. 5.

Figure 3:
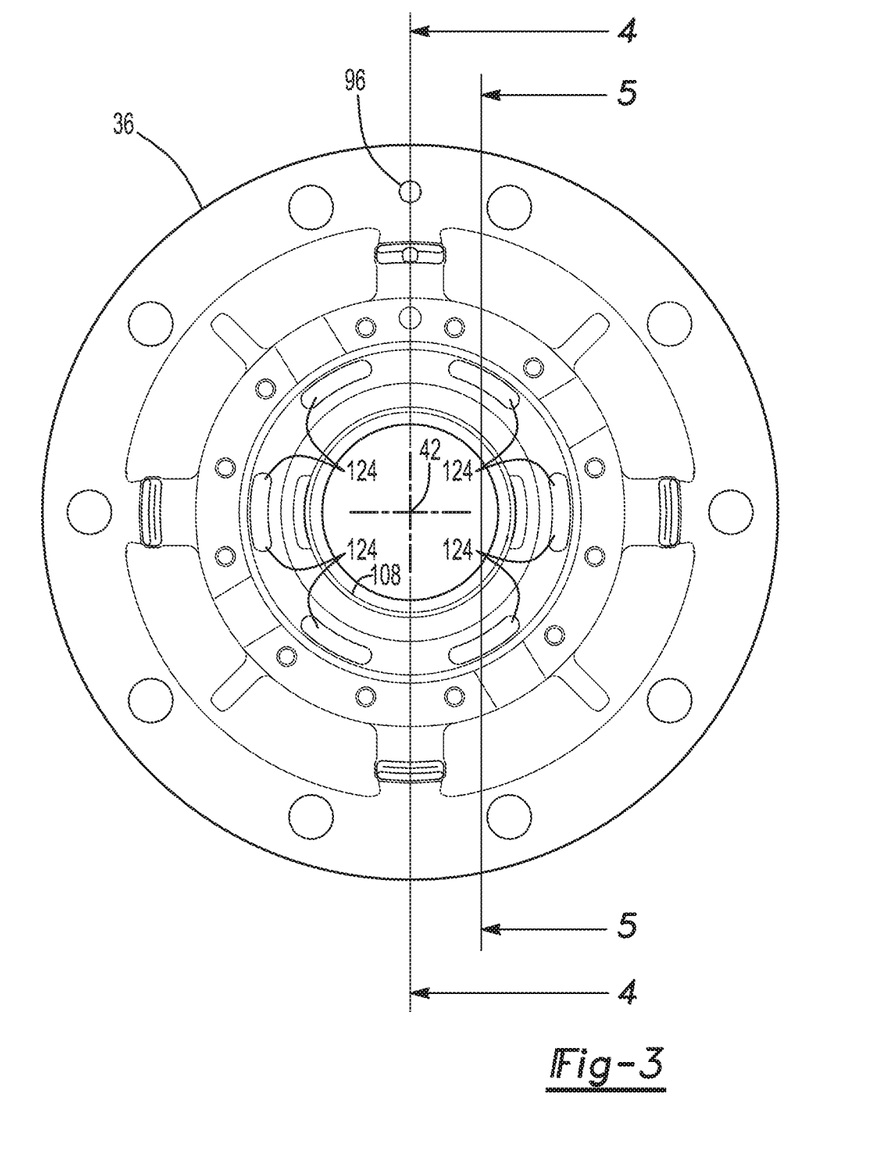
FIG. 3 is an end view of a wheel hub.

As readily seen in the end view depicted in FIG. 3, the plurality of internal passages 124 are circumferentially spaced around the hub 36. The internal passages 124 operate to provide a plurality of lubricant paths formed in the wheel hub that are configured to route lubricant to axially bypass the seal chamber 106. The lubricant paths formed in the hub 36 are located radially outward of the seal chamber as seen by the relative positions of the internal passages 124 and the first sealing element 108. Also as seen in FIG. 3, the passage 46 for routing pressurized gas, as indicated by the position of tire inflation outlet port 96, is circumferentially positioned between two adjacent hub lubricant passages.

According to some aspects of the present disclosure, at least some portions of the internal passages 124 are inclined relative to axis 42 to take advantage of centrifugal forces present during rotation of the hub 36. As shown by way of example, internal passages 124 may be oriented at an angle θ relative to the axis 42 to be open toward an outboard direction. In this way, centrifugal forces present during rotation urge lubricant radially outward and thus along the incline of the internal passages. As depicted in FIG. 5, the internal passages may be angled such that lubricant is urged toward the outboard direction during rotation of the hub 36. In some examples at least one of the internal passages 124 may be oriented in an opposite direction to be open to the inboard side such that lubricant is urged toward the inboard direction during rotation. In further examples, a combination of different angles is provided at different locations around the hub 36. Such an alternating angle configuration may promote enhanced circulation in both directions between each of the hub gear reduction mechanism 38, first wheel bearing 60, and second wheel bearing 61.

According to some examples at least one of the internal passages 124 is configured to have a different dimension on an inboard side relative to an outboard side dimension. In this way, the internal passages 124 may include a tapered configuration to become either more open or more constricted in the direction of lubricant flow.

One advantage of the examples of the present disclosure is that separate lubricant reservoirs are not required for each side of the seal cavity. Utilizing a single lubricant reservoir to cycle lubricant across the internal mechanisms of the hub assembly may reduce package space requirements and facilitate a more efficient layout of the hub assembly.

An additional advantage of the examples of the present disclosure is a reduction of wheel hub service time, and thus cost. More specifically, during preventative maintenance lubricant may be replenished to the inboard second wheel hub bearing without the need to remove the hub. Certain prior art designs not only require the hub to be removed to replenish lubricant at the inboard wheel hub bearing, but also require replacement of the hub seal, further driving service time and cost. This increased cost and difficulty of service may contribute to end users opting to neglect recommended preventative maintenance schedule pertaining to replenishing the lubricant. Aspects of the present disclosure help to improve life of the inboard wheel hub bearing related to the easy and less expensive preventative maintenance.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An axle assembly comprising:
   a spindle defining an axis;
   a wheel hub that is rotatable about the axis with respect to the spindle, wherein the wheel hub is rotatably supported by a first wheel bearing and a second wheel bearing that are disposed on the spindle, the first wheel bearing being disposed axially outboard from the second wheel bearing;
   a tire inflation system including:
      first and second sealing elements that extend from the spindle to the wheel hub and cooperate to define a seal chamber therebetween that is arranged to transfer gas from the spindle to the wheel hub; and
   a lubrication system including:
      a reservoir located axially outboard of the seal chamber, and
      a hub lubricant passage arranged to route lubricant between the reservoir and the second wheel bearing, wherein the hub lubricant passage is disposed radially outward from the seal chamber and is in fluid isolation from the seal chamber, the hub lubricant passage having a first end that is disposed adjacent to the reservoir and a second end disposed opposite the first end, wherein the second end is positioned closer to the second wheel bearing than to the first wheel bearing and the second end is positioned closer to the second wheel bearing than to the seal chamber.

2. The axle assembly of claim 1 wherein the hub lubricant passage is oriented at an oblique angle relative to the axis.

3. The axle assembly of claim 2 further comprising a second hub lubricant passage that routes lubricant between the reservoir and the second wheel bearing, wherein the second hub lubricant passage is oriented at a second oblique angle with respect to the axis.

4. The axle assembly of claim 1 wherein the hub lubricant passage is oriented to direct lubricant in an outboard direction toward the reservoir during wheel hub rotation.

5. The axle assembly of claim 1 further comprising a hub gear reduction mechanism disposed within the reservoir and arranged to circulate lubricant during wheel hub rotation.

6. The axle assembly of claim 1 wherein the first end of the hub lubricant passage is disposed adjacent to the first wheel bearing.

7. The axle assembly of claim 6 further comprising a hub cap that is disposed on the wheel hub and cooperates with the wheel hub to form the reservoir, wherein the first end of the hub lubricant passage is axially positioned further from the hub cap than a pinion gear that is disposed in the reservoir and is fixedly disposed on the spindle.

8. The axle assembly of claim 1 further comprising a hub cap that cooperates with the wheel hub to form the reservoir, wherein the hub lubricant passage is remotely positioned from the hub cap.

9. The axle assembly of claim 8 wherein the first end of the hub lubricant passage is axially positioned further from the hub cap than an inner race of the first wheel bearing is positioned from the hub cap, wherein the inner race is disposed on the spindle.

10. The axle assembly of claim 8 further comprising a hub gear reduction mechanism disposed within the reservoir and arranged to circulate lubricant during wheel hub rotation, wherein the hub lubricant passage is completely disposed further inboard from the hub cap than the hub gear reduction mechanism.

11. An axle assembly comprising:
    a spindle;
    a wheel hub that is rotatable about an axis with respect to the spindle and that defines a hub lubricant passage;
    a hub cap that is disposed on an end of the wheel hub, wherein the wheel hub and the hub cap cooperate to define a reservoir; and
    first and second wheel bearings that rotatably support the wheel hub on the spindle, wherein the first wheel bearing is axially positioned along the axis closer to the hub cap than the second wheel bearing is positioned to the hub cap;
    wherein the hub lubricant passage has a first end that faces toward and is spaced apart from the hub cap and a second end that is disposed opposite the first end, wherein the first end is axially positioned further from the hub cap than an inner race of the first wheel bearing that engages the spindle is positioned from the hub cap.

12. The axle assembly of claim 11 wherein the hub lubricant passage is oriented at an oblique angle relative to the axis.

13. The axle assembly of claim 11 wherein an axle shaft extends through the spindle and is rotatable about the axis, a hub gear reduction system is disposed in the reservoir and connects the axle shaft to the wheel hub, and the entire hub lubricant passage is axially disposed further from the hub cap than the hub gear reduction system.

14. The axle assembly of claim 11 wherein an axle shaft extends through the spindle and is rotatable about the axis, a hub gear reduction system is disposed in the reservoir and connects the axle shaft to the wheel hub, and the hub gear reduction system is disposed closer to the hub cap than the hub lubricant passage.

15. The axle assembly of claim 14 wherein the first wheel bearing is axially positioned closer to the hub gear reduction system than the first end of the hub lubricant passage is axially positioned to the hub gear reduction system.

16. The axle assembly of claim 11 wherein first and second sealing elements extend from the spindle to the wheel hub and cooperate to define a seal chamber therebetween that is arranged to transfer gas from the spindle to the wheel hub, wherein the first and second sealing elements and the seal chamber are axially positioned between the first wheel bearing and the second wheel bearing, the second end of the hub lubricant passage is disposed closer to the axis than the first end of the hub lubricant passage, and the second end of the hub lubricant passage is disposed closer to the second wheel bearing than to the first and second sealing elements and the seal chamber.

17. An axle assembly comprising:
a spindle that is disposed along an axis;
a wheel hub that is rotatable about the axis and that defines a plurality of hub lubricant passages that are spaced apart from each other and are through holes in the wheel hub;
a hub cap that disposed on an outboard end of the wheel hub, the wheel hub and the hub cap cooperating to define a reservoir therebetween; and first and second wheel bearings that rotatably support the wheel hub on the spindle, the first wheel bearing being disposed along the axis closer to the hub cap than the second wheel bearing is disposed to the hub cap, wherein each hub lubricant passage of the plurality of hub lubricant passages has a first end that faces toward and is spaced apart from the hub cap and a second end that is disposed opposite the first end, wherein the second end is disposed closer to the axis than the first end is disposed to the axis and the first wheel bearing is disposed closer to the hub cap than the first end and the second end of each hub lubricant passage, and wherein the plurality of hub lubricant passages extend at an oblique angle with respect to the axis such that the plurality of hub lubricant passages all extend closer toward the axis as a distance from the hub cap increases.

18. The axle assembly of claim 17 wherein the hub lubricant passages are disposed radially outward from a seal chamber that is disposed between the spindle and the wheel hub.

19. The axle assembly of claim 17 wherein the second end of each hub lubricant passage is disposed closer to the second wheel bearing than to the first wheel bearing.

20. The axle assembly of claim 17 further comprising first and second sealing elements that extend from the spindle to the wheel hub and cooperate to define a seal chamber therebetween that is arranged to transfer gas from the spindle to the wheel hub, wherein the first and second sealing elements are axially positioned between the first wheel bearing and the second wheel bearing and the second end of each hub lubricant passage is disposed closer to the second wheel bearing than to the first and second sealing elements.

\* \* \* \* \*